Sept. 10, 1935.  O. M. C. MARISCHAL  2,013,850

DEVICE FOR MEASURING OR DRAWING ANGLES AND INCLINATIONS

Filed March 15, 1934

Inventor:
Omer Marie Cyrille Marischal
per Fred F. Barlow
Attorney

Patented Sept. 10, 1935

2,013,850

UNITED STATES PATENT OFFICE 2,013,850

DEVICE FOR MEASURING OR DRAWING ANGLES AND INCLINATIONS

Omer Marie Cyrille Marischal, St. Die, Vosges, France

Application March 15, 1934, Serial No. 715,679 In France April 18, 1933

2 Claims. (Cl. 33—88)

The instrument in accordance with this invention comprises a square or similar device for measuring or drawing angles or measuring inclinations and embodies movable and graduated arms, adapted to indicate, according to their positions:

(1) The angles between various articles,
(2) Angles relatively to the horizontal or vertical,
(3) The horizontal,
(4) The vertical, and
(5) Specified inclinations.

The present invention is based on the use of graduated blades movable around a common axis. These blades can, by being moved around this axis, be lodged between a separating wall and two plate members disposed on each side, these side members being connected at one of their extremities by means of separators and small bolts while the assembly at the other extremity is effected by means of a spindle with a butterfly nut, the said spindle serving as a pivot for the graduated blades.

This instrument, which is of simple construction, can be applied to a variety of measuring devices and will be of considerable use for architects, engineers, contractors, designers and the like.

The attached drawing shows, by way of example only, one constructional form of the invention, wherein:—

Figure 1:
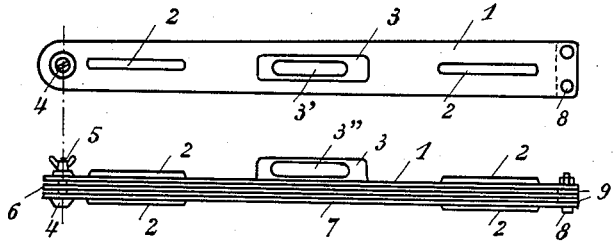
Fig. 1 shows a plan view of the apparatus closed.
Figure 2:
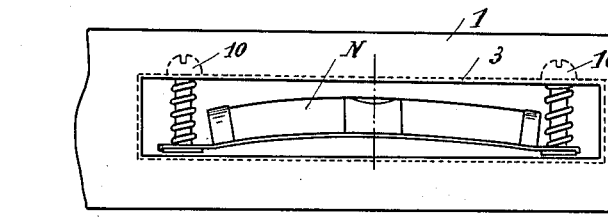
Fig. 2 is a side view, the movable blades being removed.
Figure 3:
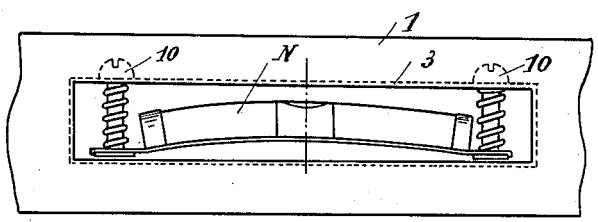
Figure 4:
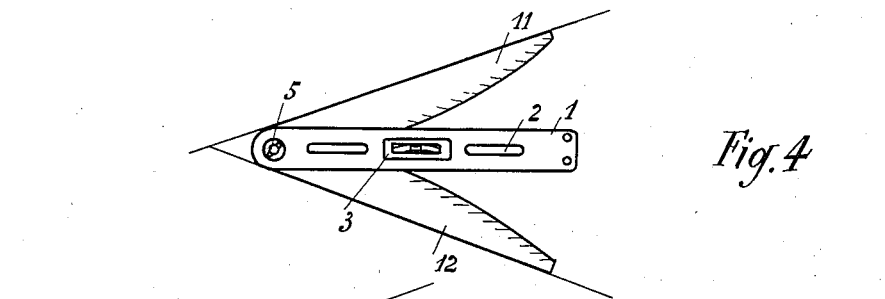
Figures 5, 6:
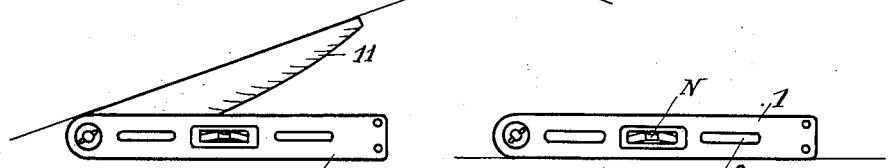
Figure 7:
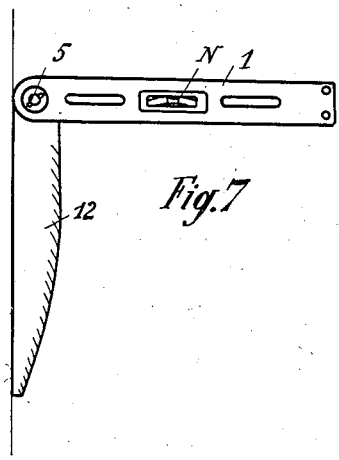
Figure 8:
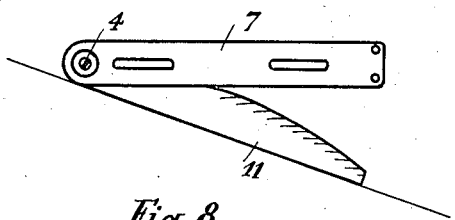

Fig. 3 is a view on a larger scale of the housing to receive the spirit level, and Figs. 4 to 8, inclusive, show different positions of use of the instrument for testing and drawing various angles (Fig. 4) for determining the value of the angles formed by an article with the horizontal (Fig. 5), for determining the horizontal (Fig. 6), the vertical (Fig. 7), and, finally, for determining slopes or inclinations in centimetres per metre (Fig. 8).

The instrument in accordance with the present invention comprises two parallel outer plates 1 and 7 separated by an intermediate member 6, the assembly being connected at one end by separators 9 and two small bolts 8. Movable graduated blades 11 and 12 are adapted to pivot on a spindle 4 in the free spaces between member 6 and the plates 1 and 7. This spindle is provided with a wing nut 5 destined to lock the blades in their housings when the instrument is not in use. Moreover, these blades may thereby be locked in any given position of adjustment.

The upper plate 1 is provided with a housing 3 suitable to receive a spirit level N (Fig. 3), this level being mounted on two screws 10 with surrounding springs to permit adjustment of the level. The said housing embodies two inspection windows 3' and 3".

In order to ensure the rigidity of the plates 1 and 7, they are provided with longitudinal pressed portions 2.

The instrument may be formed of any suitable material and the dimensions thereof can be varied as desired.

For drawing and testing angles, one or both blades may be utilized according to the magnitude of the angle; if the two blades are used the indications given by the two blades are added.

What I claim and desire to secure by Letters Patent of the United States of America is:—

1. A device for measuring and drawing angles and inclinations comprising outer plate members, an intermediate partition, spacing members for holding said plate members and said partition in spaced relation, movable blades pivoted between said plate members and said partition, said blades being graduated in degrees on their edges, clamping means to hold said blades in a given position and a spirit level fixed to one of said plate members.

2. A device for measuring and drawing angles and inclinations, comprising outer plate members, an intermediate partition, means to hold said plate members and said partition in spaced relation at one end, a spindle at the other end, a pair of blades pivoted on said spindle, said blades being graduated in degrees, a wing nut cooperating with said spindle and adapted to hold said blades in any given position, a hollow housing on one of said plate members and a spirit level in said housing.

OMER MARIE CYRILLE MARISCHAL.